F. V. GARDNER.
PNEUMATIC TIRE.
APPLICATION FILED AUG. 23, 1920.

1,372,417.

Patented Mar. 22, 1921.

Inventor.
Frank V. Gardner,
By C. W. Miles,
Attorney.

UNITED STATES PATENT OFFICE.

FRANK V. GARDNER, OF CINCINNATI, OHIO.

PNEUMATIC TIRE.

1,372,417. Specification of Letters Patent. Patented Mar. 22, 1921.

Application filed August 23, 1920. Serial No. 405,378.

*To all whom it may concern:*

Be it known that I, FRANK V. GARDNER, a citizen of the United States, residing at Cincinnati, in the county of Hamilton and State of Ohio, have invented certain new and useful Improvements in Pneumatic Tires, of which the following is a specification.

My invention relates to improvements in automobile tires. One of its objects is to provide an improved inner tube adapted to be adjusted and employed as a temporary repair to close a perforation in the casing until a permanent repair of the casing can be conveniently made. My invention also comprises certain details of form, combination and adjustment all of which will be fully set forth in the description of the accompanying drawings in which.

Figure 1:
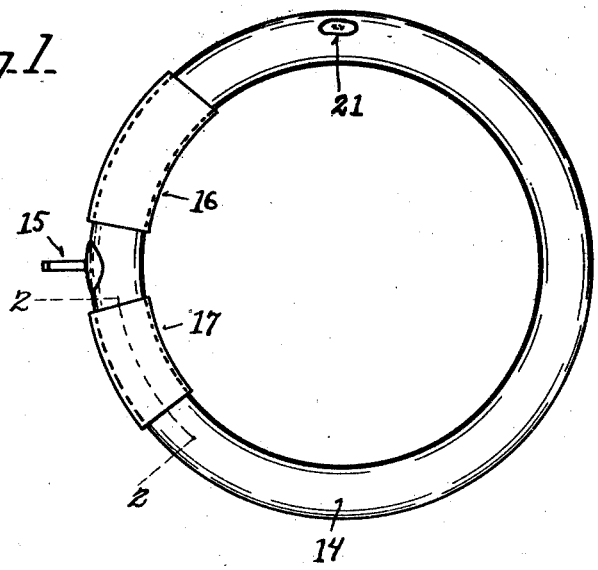
Figure 1 is a plan of an inner tube for automobile tires embodying my invention.

The accompanying drawings illustrate the preferred embodiment of my invention, in which 14 represents an inner tube, 15 the air valve and port through which air under pressure is forced to inflate the inner tube.

The inner tube is preferably of the annular type, but may be of the type which is severed and the ends closed and overlapped in the casing, loosely encircling the inner tube, I provide one or more annular sleeves 16 and 17 of soft rubber, and about the same thickness as the inner tube. These sleeves 16 and 17 are adjustable endwise along the exterior of the inner tube, and when the inner tube is inflated they are held firmly in frictional engagement with the exterior of the inner tube and also with the interior of the outer tube or casing 20, and said sleeves are thus firmly held in place by the air pressure against displacement relative to the inner tube or the casing.

In the event that the inner tube becomes perforated a patch 21 is secured to the inner tube by adhesives in the usual manner and then before to close the perforation, and then before fully inflating the inner tube one of the entire sleeves 16 and 17, or a section of one of said sleeves, produced for instance by severing transversely a fractional or sectional portion from the tube 16 is adjusted endwise, along the inner tube to a position encircling the inner tube at the point where the patch has been employed. Thereafter upon fully inflating the inner tube the patch is firmly held in place and is much less liable to become detached, or to leak air than without the sleeve 16 in contact with the exterior of the tube and patch.

Figure 3:
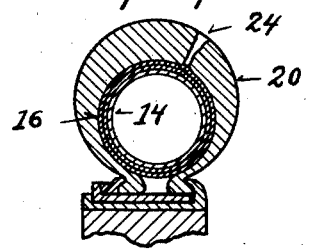
Fig. 3 is a view similar to Fig. 2 illustrating the application of my improvements to the closing of a perforation in the casing.
Figure 2:
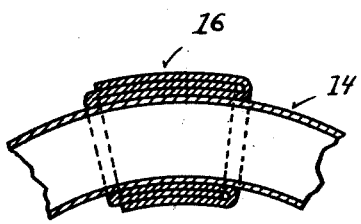
Fig. 2 is an enlarged sectional detail on line 2—2 of Fig. 1 illustrating the adjustment of the inner tube to close a perforation in the casing.

The tubes 16 and 17 are also either of them adapted to be folded upon themselves to form two or more thicknesses of material at any desired locality along the inner tube as shown in Fig. 2. In the event of the outer tube or casing 20 becoming perforated, as for instance at 24, Fig. 3, one of the sleeves 16 and 17 is folded upon itself substantially as indicated in Fig. 2, into a plurality of thicknesses depending upon the nature of the perforation in the casing, and adjusted along the inner tube to come opposite the perforation 24 in the casing. The inner tube is then inflated as fully as may safely be done under the circumstances whereupon the inner tube forces a portion of the sleeve into the inner end of the perforation 24, while the reinforced sleeve in turn reacts upon and holds the inner tube in place, and prevents it from extruding through the perforation in the casing, or causing a perforation of the inner tube at the same place as the perforation in the casing. If desired two or more separate sleeves 16 and 17 may as the equivalent of folding a single sleeve upon itself be adjusted to positions one above the other similar to what is shown in Fig. 2.

The apparatus herein shown and described is capable of considerable modification without departing from the principle of my invention as defined by the scope of the appended claim.

What I claim is:

A pneumatic tire comprising a casing, an inner tube, and an annular flexible repair sleeve encircling a portion of the inner tube and adjustable endwise thereon, said sleeve being adapted to be telescopically folded upon itself to form a sleeve of a plurality of thicknesses of material and adapted to serve as a repair member for perforations of the casing or perforations of the inner tube.

In testimony whereof I have affixed my signature.

FRANK V. GARDNER.